(12) United States Patent
Takeuchi et al.

(10) Patent No.: US 11,543,616 B2
(45) Date of Patent: Jan. 3, 2023

(54) IN-VEHICLE IMAGE PICKUP DEVICE

(71) Applicant: HITACHI AUTOMOTIVE SYSTEMS, LTD., Hitachinaka (JP)

(72) Inventors: Kenichi Takeuchi, Hitachinaka (JP); Hidenori Shinohara, Hitachinaka (JP); Hiroyuki Kudo, Hitachinaka (JP); Akihiro Yamaguchi, Tokyo (JP)

(73) Assignee: Hitachi Astemo, Ltd., Ibaraki (JP)

( * ) Notice: Subject to any disclaimer, the term of this patent is extended or adjusted under 35 U.S.C. 154(b) by 337 days.

(21) Appl. No.: 16/652,859

(22) PCT Filed: Oct. 23, 2018

(86) PCT No.: PCT/JP2018/039271
§ 371 (c)(1),
(2) Date: Apr. 1, 2020

(87) PCT Pub. No.: WO2019/093113
PCT Pub. Date: May 16, 2019

(65) Prior Publication Data
US 2020/0310069 A1    Oct. 1, 2020

(30) Foreign Application Priority Data
Nov. 7, 2017    (JP) .............................. JP2017-215019

(51) Int. Cl.
*G02B 7/02*    (2021.01)
*B60R 1/00*    (2022.01)
*G03B 17/02*   (2021.01)

(52) U.S. Cl.
CPC ................ *G02B 7/02* (2013.01); *B60R 1/001* (2013.01); *G03B 17/02* (2013.01)

(58) Field of Classification Search
CPC ........... B60R 1/001; B60R 11/04; G02B 7/02; G03B 17/02; G03B 35/08; H04N 5/2252; H04N 5/2254
See application file for complete search history.

(56) References Cited

U.S. PATENT DOCUMENTS

2015/0146094 A1* 5/2015 Seger ................... H04N 5/2252
                                                    348/374
2015/0158435 A1* 6/2015 Ohsumi ................... G01C 3/18
                                                    348/375
(Continued)

FOREIGN PATENT DOCUMENTS

JP    2001-242521 A    9/2001
JP    2003-219235 A    7/2003
(Continued)

OTHER PUBLICATIONS

International Search Report, PCT/JP2018/039271, dated Jan. 15, 2019, 2 pgs.

*Primary Examiner* — Amy R Hsu
(74) *Attorney, Agent, or Firm* — Volpe Koenig

(57) ABSTRACT

The present invention provides an in-vehicle image pickup device wherein highly accurate optical axis adjustment of an image pickup unit with respect to a housing can be performed, while suppressing precision machining of the housing as much as possible. The present invention is provided with: camera modules having a lens holder, which has the optical axis of a lens as a normal line, and which has one or more reference surfaces that are formed therein; and a housing having an insertion hole, into which the lens holder is inserted, facing surfaces facing the reference surfaces, and adhesive filling sections penetrating from the side of the facing surfaces to the reverse side of the facing surfaces.

4 Claims, 5 Drawing Sheets

(56) References Cited

U.S. PATENT DOCUMENTS

| | | | | |
|---|---|---|---|---|
| 2016/0334597 A1* | 11/2016 | Bohn | .................... | H04N 5/2252 |
| 2017/0126938 A1* | 5/2017 | Newiger | .................... | B60R 1/00 |
| 2017/0251182 A1* | 8/2017 | Siminoff | ................ | H04L 65/612 |
| 2017/0307841 A1* | 10/2017 | Nakamura | ............. | G03B 43/00 |
| 2018/0316830 A1* | 11/2018 | Gartrell | ................ | H04N 5/2256 |
| 2020/0333618 A1* | 10/2020 | Yamaguchi | ............ | G03B 17/12 |
| 2021/0227108 A1* | 7/2021 | Okamura | ................ | G02B 7/025 |

FOREIGN PATENT DOCUMENTS

| | | | |
|---|---|---|---|
| JP | 2005-274612 A | | 10/2005 |
| JP | 2006-251367 A | | 9/2006 |
| JP | 2008-020837 A | | 1/2008 |
| JP | 2015-511327 A | | 4/2015 |
| WO | 2017/179516 A1 | | 10/2017 |

\* cited by examiner

IN-VEHICLE IMAGE PICKUP DEVICE

TECHNICAL FIELD

The present invention relates to an in-vehicle image pickup device that acquires an image using an imaging element.

BACKGROUND ART

PTL 1 aims to improve the durability of the camera unit by improving the productivity of the camera unit and reducing the number of component parts of the camera unit, and discloses a camera assembly structure which includes a camera body unit and an optical system built in the camera body unit. The camera assembly structure includes a circuit board mounted with a sensor that is attached to the camera body unit and converts optical information through the optical system into electrical information, and a mounting screw which can take a first state of fixing the circuit board to the camera body unit and a second state capable of displacing a mounting position of the circuit board in the camera body unit.

CITATION LIST

Patent Literature

PTL 1: JP 2001-242521 A

SUMMARY OF INVENTION

Technical Problem

In recent years, as a technique for measuring a three-dimensional position of a subject, a stereo camera using a pair of imaging units has attracted attention.

The stereo camera specifies a deviation (parallax) in a horizontal direction related to the object detected in two captured images captured by a pair of imaging units, and calculates a distance toward the object using the principle of triangulation based on the specified parallax.

In addition, the stereo camera has a function of determining whether the object is a vehicle, a pedestrian, or another object based on the shape and size of the imaged object at the same time as that of specifying the distance.

Such a stereo camera is applied to an in-vehicle system that supports safe driving of a car, a monitoring system that detects intrusion of a suspicious person or an abnormality, and the like.

In the field of automobiles, it is being actively promoted the development of technologies related to ASV (Advanced Safety Vehicle), such as detecting information of vehicles and obstacles that exist ahead with cameras and radars mounted thereon to determine the degree of danger of colliding with the vehicles ahead based on the detected information so as to issue a warning to the driver, automatically operating the brake to decelerate, or automatically increasing or decreasing the traveling speed so as to keep the distance toward the preceding vehicle safe, etc.

As a vehicle collision prevention system, a system that issues an inter-vehicle distance warning, a drowsy driving warning, pedestrian protection, and a rear obstacle warning has been considered. In addition, systems for preventing lane departure, maintaining the distance between vehicles, and automatically avoiding accidents have also been considered. In such a system, the above-described stereo camera is used as one of the distance measuring devices mounted to measure the distance toward the target.

It is expected that this will assist the driver's vision and help prevent a collision accident and the like, so an inexpensive and highly reliable in-vehicle stereo camera is desired.

In such an in-vehicle image pickup device such as a stereo camera or a monocular camera, in order to achieve the above-described functions, especially, a stereo camera requires a highly accurate distance between two imaging units defined as a base line length.

Among the stereo cameras, a camera module that is composed of a lens and an imaging element and is adjusted and fixed in a state where an image formed by the lens is correctly formed on the imaging surface is called a camera module.

In a stereo camera, the positional accuracy of the pair of left and right camera modules and the rotational accuracy with respect to the optical axis are important. In particular, the distance between the left and right camera modules is called a base line length, and the positional accuracy affects the distance measuring accuracy of the stereo camera.

As a technique for adjusting the optical axis with high accuracy, there is PTL 1 described above. In PTL 1, the circuit board on which the imaging unit is mounted is directly fixed to a housing with screws, and the screw diameter and the hole diameter are provided so that the position of the circuit board can be adjusted, as a result, high-precision adjustment is possible.

However, in a case where the imaging unit is fixed to the housing directly with a screw or the like when the imaging unit is fixed to the housing, there is a problem that a highly accurate positioning structure is required for the imaging unit and the housing.

In addition, conventionally, in order to increase the accuracy of the part that receives the camera module or the part that receives the lens part of the camera module of the housing that fixes the camera module, high-precision cutting processing is performed on the housing that is cast with aluminum die casting etc.

However, in a case where the housing is manufactured by aluminum die casting or the like, high-precision processing is required in order to require the accuracy of the positioning structure. This processing man-hour has caused the cost of the housing to be high. In addition, the processing accuracy is also limited by the processing accuracy of the processing machine, but this is a factor of the mounting error of the camera module and one of the factors of the measurement error in the stereo camera system.

The invention has been made in view of the above problem, and an object thereof is to provide an in-vehicle image pickup device wherein highly accurate optical axis adjustment of an imaging unit with respect to a housing can be performed while suppressing precision machining of the housing as much as possible.

Solution to Problem

The invention includes a plurality of means for solving the above-mentioned problems and, for example, is characterized in an imaging element that includes a lens and a lens holder on which at least one or more reference surfaces are formed, with an optical axis of the lens as a normal line, and a housing that includes an insertion portion through which the lens holder is inserted, a facing surface which faces the reference surface, and at least two or more adhesive filling portions which penetrate from the facing surface to a surface opposite to the facing surface.

Advantageous Effects of Invention

According to this invention, the optical axis adjustment of an imaging unit can be accurately adjusted with respect to a housing while suppressing precision machining of the housing as much as possible. Objects, configurations, and effects besides the above description will be apparent through the explanation on the following embodiments.

DESCRIPTION OF EMBODIMENTS

Hereinafter, an embodiment of an in-vehicle image pickup device according to the invention will be described with reference to the drawings using a stereo camera as an example.

First, an application example of an in-vehicle stereo camera will be described with reference to FIG. 1.

Figure 1:
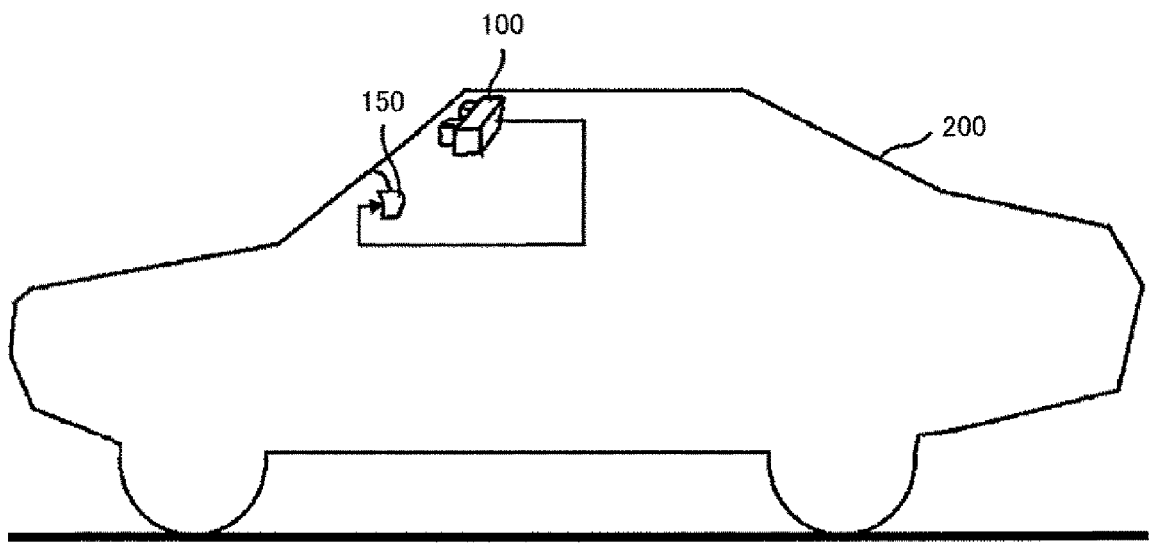
FIG. 1 is a diagram illustrating a vehicle mounted with a stereo camera which is an example of an in-vehicle image pickup device according to the invention.

For example, as illustrated in FIG. 1, an in-vehicle stereo camera 100 is mounted on a vehicle 200 such as an automobile, captures an image of an object within a predetermined range in front of the vehicle 200, and recognizes and monitors an object outside the vehicle from the captured image.

The stereo camera 100 is arranged at a position that does not obstruct the driver's field of view, such as near the rearview mirror of the vehicle 200. The image captured by the stereo camera 100 is processed to calculate three-dimensional distance distribution information, and a road shape and three-dimensional positions of a plurality of three-dimensional objects are detected at high speed from the calculated distance distribution information. Based on the detection result, a preceding vehicle or an obstacle is specified, and a collision warning determination process is performed. If the recognized object is determined to be an obstacle to the vehicle 200, a warning is given to a driver by displaying it on a display device 150 installed in front of the driver, and the automatic collision avoidance control of the vehicle body and the like are realized by connecting an external device which controls actuators (not illustrated).

The stereo image processing used in these systems is to obtain a distance by applying a triangulation technique to a pair of captured images captured at an interval in position. In general, an apparatus for realizing the processing includes a pair of imaging units and a stereo image processing LSI (Large-Scale Integrated circuit) that performs triangulation processing on the pair of captured images output by these imaging units.

At this time, the stereo image processing LSI realizes the triangulation processing by performing a process for obtaining a pixel position of a feature point common to the mutual images and the number of pixels in which the feature point is shifted in the pair of images from pixel information included in the pair of images.

Therefore, it is ideal that there is no shift other than parallax between a pair of images, and it is necessary to adjust each of the imaging units so that there is no shift in optical characteristics and signal characteristics. Especially in an in-vehicle environment, there is an application demand that, for example, takes safety in advance by detecting a preceding vehicle, a person, an obstacle, and the like. Therefore, there is a need to securely realize distance measurement and recognition of a long-distance object.

In the stereo camera 100, the relative positional relation between the left and right photographing optical systems is very important, and it is generally required that the farther the object is, the more there is no displacement other than the parallax described above.

First Embodiment

Next, a stereo camera according to a first embodiment, which is one of the preferred embodiments of the invention, will be described with reference to FIGS. 2 to 4C.

Figure 2:
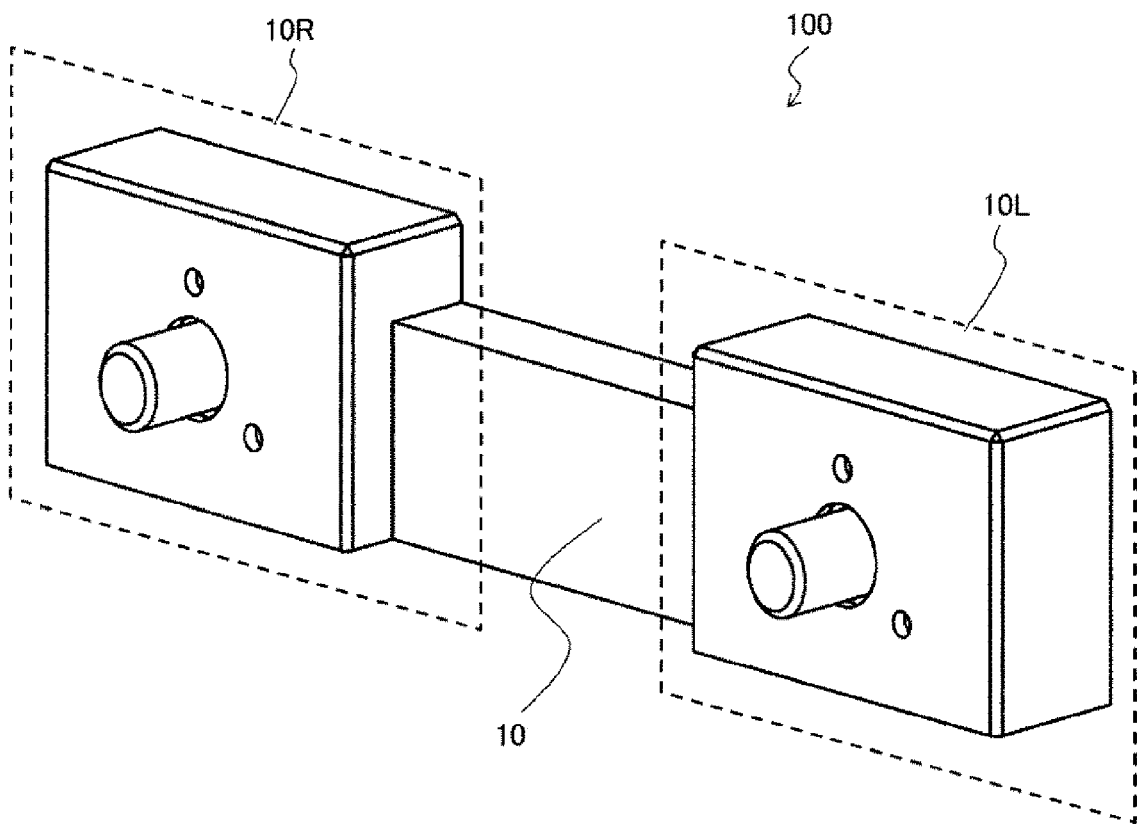
FIG. 2 is a diagram illustrating an schematic configuration of a stereo camera of a first embodiment of the invention.
Figure 3:
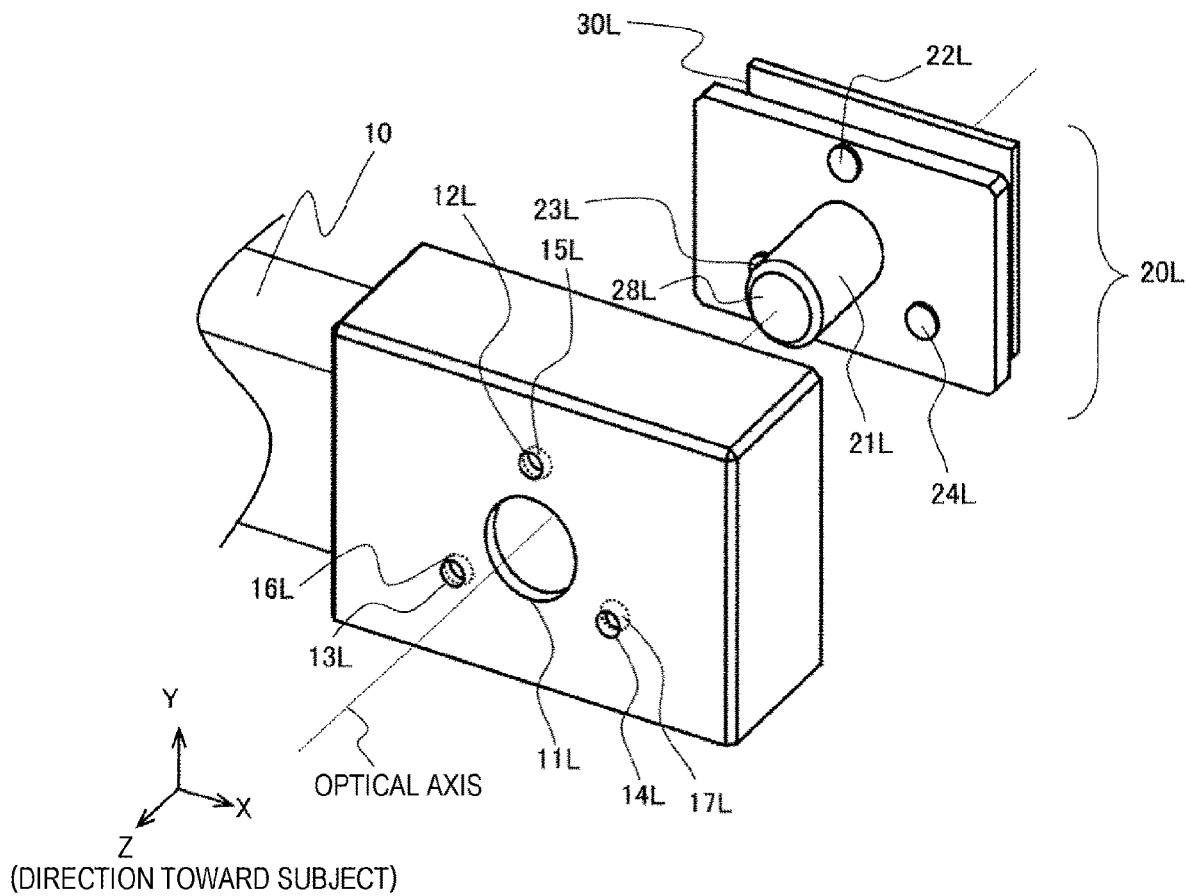
FIG. 3 is a diagram illustrating a schematic configuration of a housing and a camera module of a stereo camera according to the first embodiment.
Figure 4A:
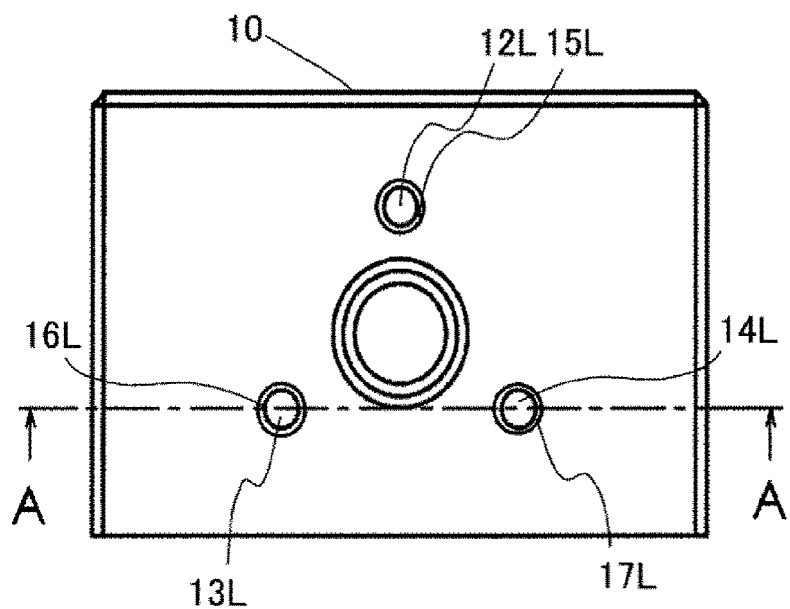
FIG. 4A is a diagram for describing a characteristic structure of the stereo camera according to the first embodiment.
Figure 4B:
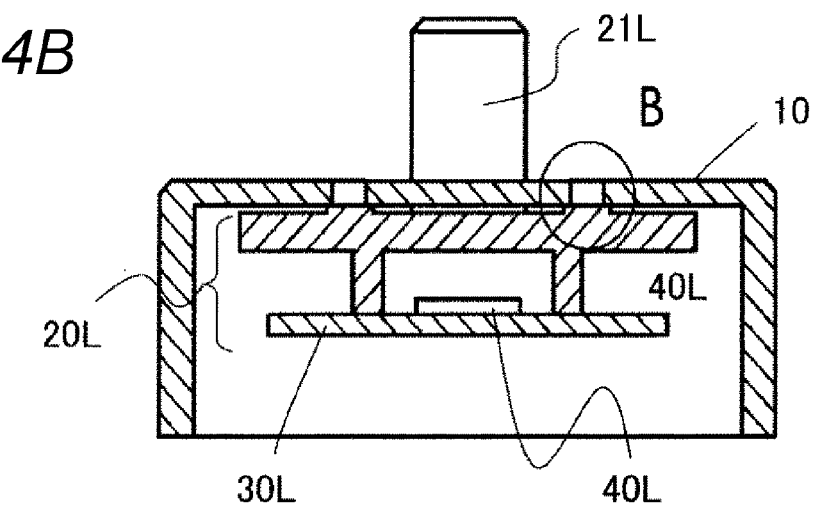
FIG. 4B is a cross-sectional view taken along line A-A of FIG. 4A.
Figure 4C:
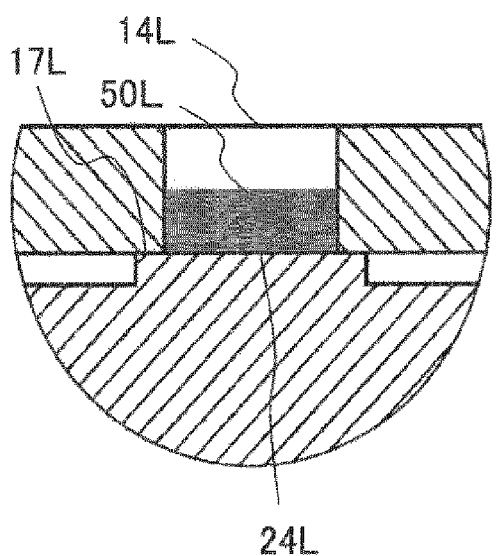
FIG. 4C is an enlarged view of a region B in FIG. 4B.

FIG. 2 is a diagram illustrating a schematic configuration of the stereo camera according to the first embodiment, FIG. 3 is a diagram illustrating a housing of one camera (left side) of the stereo camera of this embodiment, and a configuration of a camera module, and FIG. 4A is a cross-sectional view illustrating a method of fixing a module to a housing, FIG. 4B is a cross-sectional view taken along the line A-A of FIG. 4A, and FIG. 4C is an enlarged view of a region B in FIG. 4B.

In FIG. 2, the stereo camera 100 has a pair of imaging units (a left imaging unit 10L and a right imaging unit 10R), and the left imaging unit 10L and the right imaging unit 10R are fixed to a housing 10.

Next, the relation between the camera module and the housing in the imaging unit will be described using the left imaging unit 10L as an example with reference to drawings except FIGS. 1 and 2.

The structure of the right imaging unit 10R is a symmetrical structure of the left imaging unit 10L, and a detailed description thereof will be omitted.

As illustrated in FIGS. 3 to 4C, in the left imaging unit 10L, the housing 10 and a camera module 20L are not engaged with each other by a member such as a screw, and are fixed to each other in the positional relation by an adhesive 50L in adhesive filling portions 12L, 13L, and 14L.

As illustrated in FIGS. 3 and 4B, the camera module 20L includes a lens 28L, a lens holder 21L that holds the lens 28L, and a substrate 30L on which the imaging element 40L is mounted.

The camera module 20L is adjusted with high precision so that the distance between the camera module 20L and the paired camera module 20R is located at a desired distance, and the optical axis direction rotational displacement (roll angle) is corrected such that the optical axes are parallel to each other. Here, the adjustment of the roll angle is corrected by observing the pixels arranged in a grid pattern of the imaging element 40L from the input surface side of the lens 28L, and calculating the rotational direction shift of the imaging element 40L therefrom.

The camera module 20R and the camera module 20L have the same configuration and are arranged side by side.

As illustrated in FIGS. 3 and 4A, at least one or more reference surfaces 22L, 23L, and 24L having the optical axis of the lens 28L as a normal line are formed at three places in the lens holder 21L. The reference surfaces 22L, 23L, and 24L are, when viewed from the optical axis direction of the camera module 20L, in a positional relation in which the lens 28L and the imaging element 40L are placed within a triangular region connecting the centers of the three reference surfaces 22L, 23L, and 24L.

As illustrated in FIG. 4C, the reference surfaces 22L, 23L, and 24L do not leak to the camera module 20L side when the liquid adhesive 50L is filled in the adhesive filling portion 14L. In other words, the area is set larger than the corresponding adhesive filling portions 12L, 13L, 14L in order that the adhesive filling portion 14L set to the housing 10 is covered by the reference surface 24L on the camera module 20L side.

The adhesive 50L is an adhesive having photocurability or a combination of photocurability and thermosetting properties.

The substrate 30L and the imaging element 40L are configured to be adjusted in optical axis, focus, and inclination (six axes; tilt (θx, θy), height (Z), plane position (X, Y, θz)) such that image information input to the lens 28L is formed on the imaging element 40L, and fixed to the camera module 20L by adhesive. The imaging element 40L is configured by a CMOS (Complementary Metal Oxide Semiconductor) for acquiring an image or the like.

Returning to FIG. 3, the housing 10 is formed with an insertion hole 11L, facing surfaces 15L, 16L, and 17L, and adhesive filling portions 12L, 13L, and 14L. The insertion hole 11L is a hole for inserting a lens barrel holding the lens 28L in the lens holder 21L of the camera module 20L.

The facing surfaces 15L, 16L, and 17L are surfaces whose optical axes facing the reference surfaces 22L, 23L, and 24L are normal lines, and the facing surfaces 15L, 16L, and 17L are assembled to follow the common reference surfaces 22L, 23L, and 24L having the optical axis of the lens 28L of the camera module 20L as a normal line.

The adhesive filling portions 12L, 13L, 14L are holes penetrating in parallel in the optical axis direction from the facing surface 15L, 16L, and 17L to the opposite surface, and are formed, the number of which is three, corresponding to the reference surfaces 22L, 23L, and 24L of the camera module 20L.

In this embodiment, the pair of camera modules 20L and 20R whose positions have been adjusted with high precision are bonded and fixed to the housing 10 by filling the adhesive filling portions 12L, 13L and 14L with the adhesive 50L.

In the invention, in order to enhance the positional accuracy of the pair of camera modules 20R and 20L, the housing 10 is not used with high precision processing, but the positional accuracy of the pair of camera modules 20R and 20L is determined and maintained by using a jig and a positioning member provided in the camera modules 20R and 20L, and the housing 10 is combined therewith.

In addition, the camera modules 20R and 20L are structured to be chucked from the side opposite to the lens 28L surface and to cover the housing 10 from the lens 28L surface side.

In the housing 10 combined with the pair of camera modules 20R and 20L whose positions have been adjusted, the adhesive filling portions 12L, 13L and 14L filled with the adhesive 50L are set in the optical axis direction of the camera modules 20R and 20L. The pair of camera modules 20R and 20L are fixed to the housing 10 with high precision using an adhesive 50L from the front side of the camera modules 20R and 20L.

Hereinafter, a method of attaching the camera module 20L to the housing 10 will be described with reference to FIGS. 3 to 4C, taking the left camera module 20L as an example.

As described above, the housing 10 is provided with the insertion hole 11L for taking the lens 28L of the camera module 20L out of the housing 10. Here, since the insertion hole 11L is an insertion hole only for taking out the lens 28L of the camera module 20L to the outside of the housing 10, it is not necessary that the insertion hole 11L be manufactured with high accuracy in position and diameter.

The details of the bonding will be described in the adhesive filling portion 14L.

When the lens holder 21L of the camera module 20L is inserted through the insertion hole 11L, the adhesive filling portion 14L set in the housing 10 has a shape in which a lid is formed on the reference surface 24L on the camera module 20L side, and even if the liquid adhesive 50L is filled, it does not leak to the camera module 20L side.

At the time of filling and curing the adhesive 50L, the optical axes are matched in the direction of gravity so that the adhesive 50L does not leak from the form on the cup formed by the adhesive filling portion 14L and the reference surface 24L of the camera module 20L, so that the housing 10 is oriented upward and the camera module 20L is oriented downward.

The adhesive is filled and cured in the adhesive filling portions 12L and 13L in the same manner.

After the adhesive is cured, if the fixing jig of the pair of camera modules 20L and 20R is released, the state in which the camera modules 20L and 20R maintaining the highly accurately positioned posture are completely adhered to the housing 10.

Next, the effects of this embodiment will be described.

The stereo camera 100 of the first embodiment of the invention includes the lens 28L, the camera modules 20R and 20L having the lens holder 21L, which has the optical axis of the lens 28L as a normal line, and which has one or more reference surfaces 22L, 23L, and 24L that are formed therein, and a housing 10 having the insertion hole 11L, into which the lens holder 21L is inserted, facing surfaces 15L, 16L, and 17L facing the reference surfaces 22L, 23L, and 24L, and adhesive filling portions 12L, 13L, 14L penetrating from the side of the facing surfaces 15L, 16L, and 17L to the reverse side of the facing surfaces 15L, 16L, and 17L.

Thus, the lens holder 21L having at least one or more reference surfaces 22L, 23L, and 24L formed with the optical axis of the lens 28L as a normal line, the facing surface 15L, 16L, and 17L facing the reference surfaces 22L, 23L, and 24L, and the housing 10 having the adhesive filling portions 12L, 13L, 14L penetrating from the facing surfaces 15L, 16L, and 17L to the surfaces opposite to the facing surfaces 15L, 16L, and 17L are fixed with the adhesive 50L.

Therefore, it is possible to reduce the cost by minimizing the precision processing or molding of the housing 10, and the highly accurate optical axis adjustment of the pair of camera modules 20R and 20L with respect to the housing 10 can be performed.

In addition, the camera modules 20R and 20L have three reference surfaces 22L, 23L and 24L formed therein, and the housing 10 has three adhesive filling portions 12L, 13L and 14L. The optical axes of the camera modules 20R and 20L can be adjusted with respect to the housing 10 with higher precision and without any trouble.

Further, since the reference surfaces 22L, 23L, and 24L are disposed so as to surround the lens 28L and the imaging element 40L, the optical axes of the pair of camera modules 20R and 20L with respect to the housing 10 can be adjusted with higher accuracy.

Second Embodiment

Figure 5A:
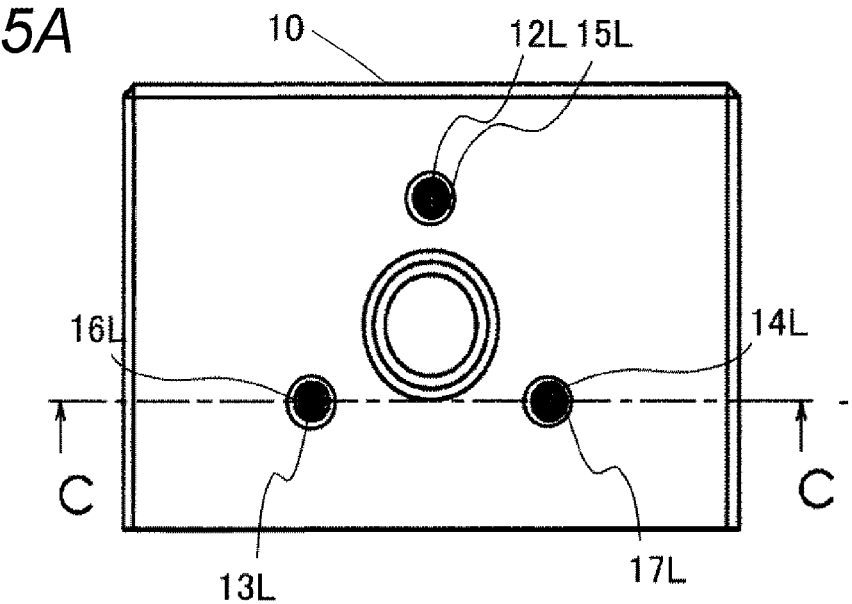
FIG. 5A is a diagram for describing a characteristic structure of a stereo camera according to a second embodiment of the invention.

A stereo camera according to a second embodiment of the invention will be described with reference to FIGS. 5A to 5C. To the same configurations as those of the first embodiment, the same symbol will be attached, and the description thereof will be omitted. The following embodiments are also the same. FIG. 5A is a diagram for describing a characteristic structure of the stereo camera according to the second embodiment, FIG. 5B is a cross-sectional view taken along the line C-C of FIG. 5A, and FIG. 5C is an enlarged view of a region D in FIG. 5B.

The stereo camera 100 of the first embodiment and the stereo camera of this embodiment are different in the surface shape of the reference surface of the camera module. Other configurations and operations are substantially the same as the configurations and operations of the stereo camera 100 according to the first embodiment described above, and the details are omitted.

Hereinafter, differences from the stereo camera 100 of the first embodiment will be described with reference to FIGS. 5A to 5C.

Figure 5B:
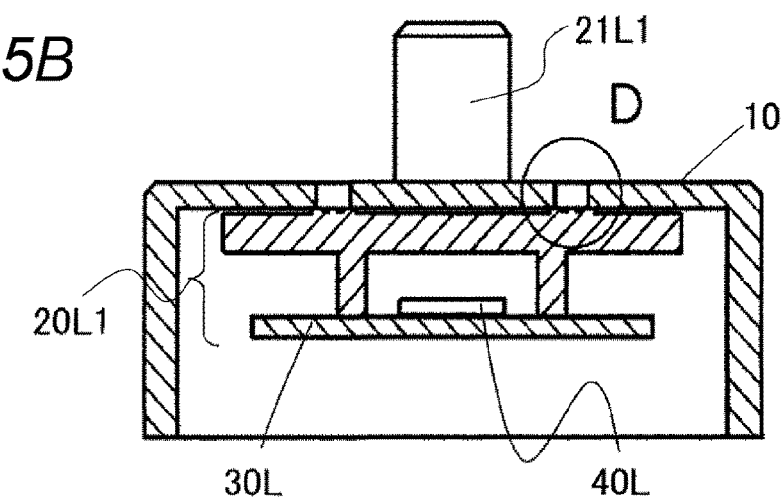
FIG. 5B is a cross-sectional view taken along line C-C of FIG. 5A.
Figure 5C:
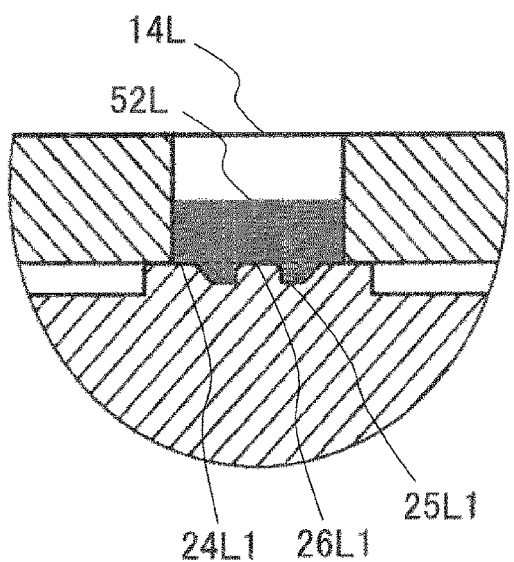
FIG. 5C is an enlarged view of a region D in FIG. 5B.

In the camera module 20L1 of this embodiment illustrated in FIGS. 5A and 5B, on the reference surface 24L1 whose normal is the optical axis of the lens held by a lens holder 21L1, as illustrated in FIG. 5C, a concave shape 25L1 and a convex shape 26L1 having a height depressed from the reference surface 24L1 are formed therein. The concave shape 25L1 and the convex shape 26L1 are formed at positions serving as marks when the reference surface 24L1 is viewed from the adhesive filling portion 14L of the housing 10.

The convex shape 26L1 is desirably the same plane as the reference surface 24L1 or a height lower than that, but may be higher than the reference surface 24L1.

The concave shape and the convex shape are provided on the remaining two reference surfaces corresponding to the adhesive filling portions 12L and 13L, respectively.

Also in this embodiment, the adhesive filling portion 14L set in the housing 10 has a shape in which a lid is formed on the reference surface 24L1 on the camera module 20L1 side, and even if the liquid adhesive 52L is filled, it does not leak to the camera module.

The adhesive 52L is an adhesive having photocurability or a combination of photocurability and thermosetting properties.

In the stereo camera according to the second embodiment of the invention, substantially the same effects as those of the stereo camera 100 according to the first embodiment described above can be achieved.

In addition, the reference surface 24L1 has a concave shape 25L1, so that the concave shape 25L1 serves as an anchor for the adhesive 52L. In a case where the Z direction is the optical axis direction, a large bonding area can be obtained while suppressing the movement in the X and Y directions. Therefore, it is possible to further increase the bonding strength.

Further, since the reference surface 24L1 has the convex shape 26L1 recessed from the reference surface 24L1 within the concave shape 25L1, the convex shape 26L1 can be used as a position observation marker before filling the adhesive. When the optical axis is adjusted, the positioning accuracy can be more easily and accurately determined.

In addition, the convex shape 26L1 also serves as an anchor for the adhesive 52L, so that the adhesive strength can be further increased.

Further, the description has been given about a case where the concave shape and the convex shape are provided on the three reference surfaces in the same manner. However, the concave shape and the convex shape provided on the plurality of reference surfaces need not be provided on all the reference surfaces. The concave shape and the convex shape may be provided on all the reference surfaces, or it is possible to provide only a shape, or to mix a reference surface having only a concave shape, a reference surface having a concave shape and a convex shape, and a reference surface having no concave and convex shapes. In addition, the concave shape and the convex shape to be provided do not need to be all the same on each reference surface, and can be changed as appropriate.

Third Embodiment

Figure 6A:
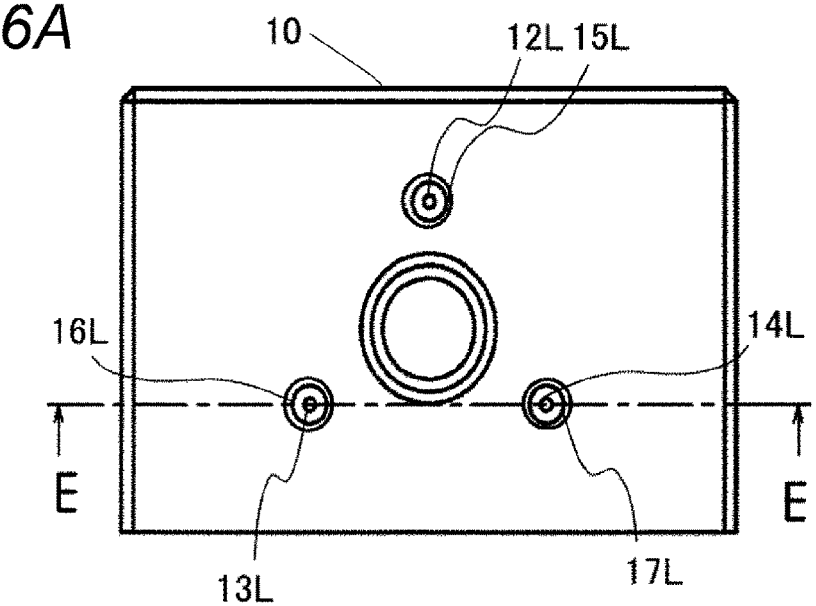
FIG. 6A is a diagram for describing a characteristic structure of a stereo camera according to a third embodiment of the invention.

A stereo camera according to a third embodiment of the invention will be described with reference to FIGS. 6A to 6C. FIG. 6A is a diagram for describing the characteristic structure of the stereo camera according to the third embodiment, FIG. 6B is a cross-sectional view taken along the line E-E of FIG. 6A, and FIG. 6C is an enlarged view of a region F in FIG. 6B.

The stereo camera 100 of the first embodiment and the stereo camera of this embodiment are different in the surface shape of the reference surface of the camera module. Other configurations and operations are substantially the same as the configurations and operations of the stereo camera 100 according to the first embodiment described above, and the details are omitted.

Hereinafter, differences from the stereo camera 100 of the first embodiment will be described with reference to FIGS. 6A to 6B.

Figure 6B:
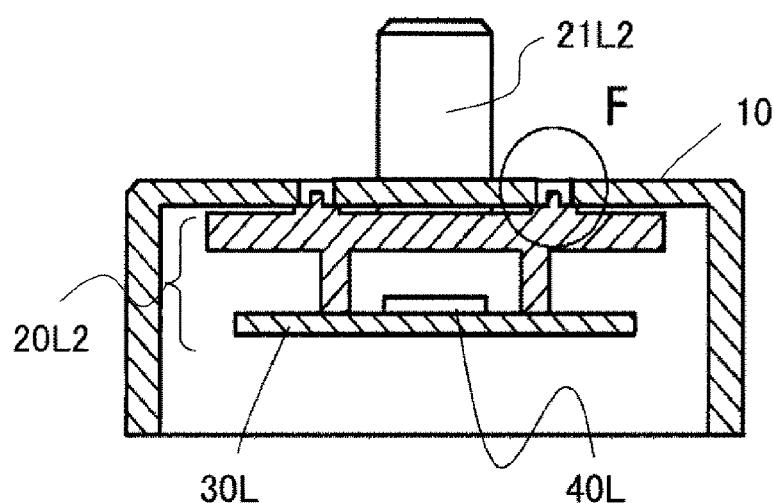
FIG. 6B is a cross-sectional view taken along line E-E of FIG. 6A.
Figure 6C:
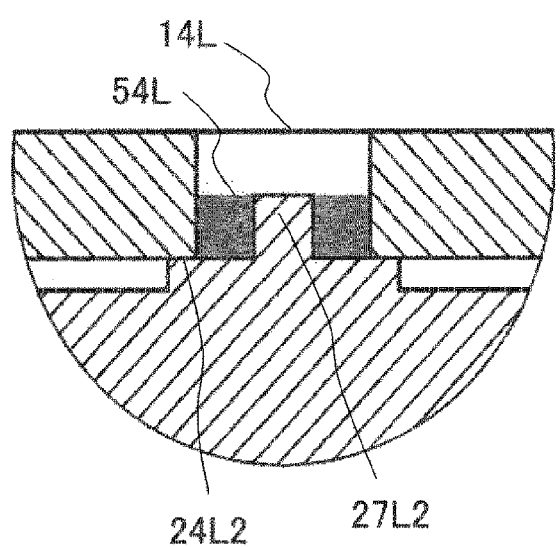
FIG. 6C is an enlarged view of a region F in FIG. 6B.

In the camera module 20L2 of this embodiment illustrated in FIGS. 6A and 6B, a convex shape 27L2 is formed on the reference surface 24L2 whose normal line is the optical axis of the lens held by a lens holder 21L2, as illustrated in FIG. 6C. The convex shape 27L2 is formed at a position serving as a mark when looking at the reference surface 24L2 from the adhesive filling portion 14L of the housing 10.

The convex shape 27L2 only needs to be at least as high as the reference surface 24L2, and may be higher or lower than the adhesive 54L.

A convex shape is also provided on each of the remaining two reference surfaces corresponding to the adhesive filling portions 12L and 13L.

Also in this embodiment, the adhesive filling portion 14L set in the housing 10 has a shape in which a lid is formed on the reference surface 24L2 on the camera module 20L2 side, and even if the liquid adhesive 54L is filled, it does not leak to the camera module.

The adhesive 54L is an adhesive having photocurability or a combination of photocurability and thermosetting properties.

In the stereo camera according to the third embodiment of the invention, substantially the same effects as those of the stereo camera 100 according to the first embodiment described above can be achieved.

In addition, the reference surface 24L2 has a convex shape 27L2, so that the convex shape 27L2 serves as an anchor for the adhesive 54L. In a case where the Z direction is the optical axis direction, a large bonding area can be obtained while suppressing the movement in the X and Y directions. Therefore, it is possible to increase the bonding strength.

Further, the description has been given about a case where the convex shape is provided in the same manner on the three reference surfaces. However, the convex shape does not need to be provided on all the reference surfaces, and the convex shape can be provided on only some of the reference surfaces. In addition, the convex shape to be provided do not need to be all the same on each reference surface, and can be changed as appropriate.

<Others>

Further, the invention is not limited to the above embodiments, and various modifications may be contained.

The above-described embodiments have been described in detail for clear understating of the invention, and are not necessarily limited to those having all the described configurations.

In addition, some of the configurations of a certain embodiment may be replaced with the configurations of the other embodiments, and the configurations of the other embodiments may also be added to the configurations of the subject embodiment. In addition, for some of the configurations of each embodiment, other configurations may be added omitted, or replaced.

For example, the case where the in-vehicle image pickup device is a stereo camera provided with two camera modules has been described, but the in-vehicle image pickup device does not need to be a stereo camera, and a camera module may be appropriately provided according to the use of the in-vehicle image pickup device.

In addition, the case where three reference surfaces and three adhesive filling parts are set for one camera module has been described. It is not necessary to set these three reference surfaces and the three adhesive filling portions for each camera module.

For example, depending on the area of the reference surface, one place can be set for one camera module (all the surfaces in contact with the facing surface of the camera module are processed as the reference surface), and two places or four or more places can be set.

In addition, two adhesive filling portions can be set for one camera module. In this case, it is desirable that the adhesive filling portion have a shape surrounding the camera module. In addition, it is also possible to set four or more adhesive filling portions.

REFERENCE SIGNS LIST 10 housing
10L left imaging unit
10R right imaging unit
11L insertion hole (insertion part)
12L, 13L, 14L adhesive filling portion
15L, 16L, 17L facing surface
20R, 20L, 20L1, 20L2 camera module (imaging element)
21L, 21L1, 21L2 lens holder
22L, 23L, 24L, 24L1, 24L2 reference surface
25L1 concave shape (concave part)
26L1 convex shape (convex portion)
27L2 convex shape (convex portion)
28L lens
30L substrate
40L imaging element
50L, 52L, 54L adhesive
100 stereo camera (in-vehicle image pickup device)
200 vehicle

The invention claimed is:

1. An in-vehicle image pickup device, comprising:
an imaging element that includes a lens and a lens holder on which at least one or more reference surfaces are formed, with an optical axis of the lens as a normal line; and
a housing that includes an insertion portion through which the lens holder is inserted, a facing surface which faces the reference surface, and at least two or more adhesive filling portions which penetrate from the facing surface to a surface opposite to the facing surface, and
wherein the reference surface has a concave portion and a convex portion, the convex portion depressed from the reference surface in the concave portion.

2. The in-vehicle image pickup device according to claim 1,
wherein the imaging element has the reference surfaces formed at three places, and
wherein the housing has three adhesive filling portions.

3. The in-vehicle image pickup device according to claim 1,
wherein, when viewed from an optical axis direction of the lens, the reference surface is disposed so as to surround the lens.

4. The in-vehicle image pickup device according to claim 1,
wherein the imaging element includes a first imaging element and a second imaging element having a configuration identical with a configuration of the first imaging element, and
wherein the first imaging element and the second imaging element are arranged side by side to be parallel to each other in the optical axis.

* * * * *